Patented Aug. 19, 1952

2,607,780

UNITED STATES PATENT OFFICE 2,607,780

5-HYDROXY-3-(6-HYDROXY-2-NAPHTHYL) PENTANOIC ACID LACTONES

Max N. Huffman, Dallas, Tex., assignor to G. D. Searle & Co., Chicago, Ill., a corporation of Illinois No Drawing. Application September 16, 1949, Serial No. 116,215

7 Claims. (Cl. 260—344)

This invention relates to lactones of the naphthalene and polyhydronaphthalene series having the general structural formula

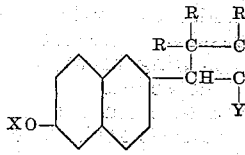

wherein X is hydrogen, lower alkyl, or lower acyl; R and R' are hydrogen or lower alkyl; and Y is hydrogen or lower alkyl; and wherein the naphthalene nucleus may be completely aromatic or partially or completely reduced. This invention also relates to methods for preparing such lactones.

In the foregoing structural formula X represents hydrogen or lower alkyl radicals such as methyl, ethyl, propyl, isopropyl, and butyl, aralkyl radicals such as benzyl, benzhydryl, xenylmethyl, phenethyl, or naphthylmethyl, or alkanoyl radicals such as acetyl, propionyl, and butyryl, and related acyl radicals such as benzoyl, cuccinyl, phthalyl, benzenesulfonyl, toluenesulfonyl, and the like. R, R', and Y represent hydrogen and lower alkyl radicals such as methyl, ethyl, propyl, isopropyl, and butyl.

Compounds of the foregoing formula are useful as hormones affecting the pituitary and/or adrenal glands without having activity of sex hormones. Compounds of this invention are also useful in the preparation of complex steriod-like molecules and related polynuclear compounds.

The compounds of this invention are prepared by reacting a β-naphthyl derivative, preferably a β-naphthyl ether, with an acid halide or anhydride derived from an acid of the following general formula

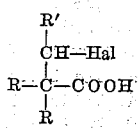

wherein R and R' have the foregoing meanings and Hal represents halogen such as chlorine, bromine, or iodine. The condensation is carried out in the presence of a Friedel-Crafts catalyst such as aluminum chloride, stannic chloride, ferric chloride, boron trifluoride, hydrogen fluoride, and the like in a solvent such as nitrobenzene or other solvent which influences substitution in the 6-position of the naphthalene nucleus. The resulting ketone which has the formula

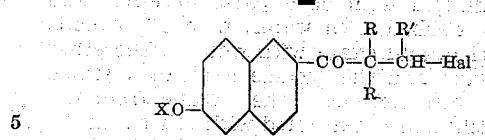

is then condensed with an ester of a halogenated acid of the formula

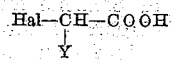

in the presence of granulated zinc, zinc dust or foil, zinc-copper powder, magnesium or zinc-amalgam. The resulting condensation product is dehydrated by heating in the presence of acid such as formic acid or an acid anhydride such as acetic anhydride and then saponified with acid or base to yield an unsaturated carboxylic acid having the general formula

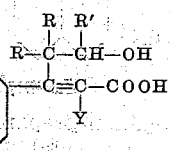

During this saponification treatment the ester linkage is cleaved to a carboxylic acid group and the halogen is split off with a formation of a hydroxyl radical. If X represents an acyl radical this may also be saponified at the same time. The unsaturated hydroxy acid is subsequently reduced to a saturated acid which under the influence of acid forms the desired lactone. The reduction can be carried out by a variety of methods. For example, the unsaturated acid may be reduced catalytically in the presence of Raney nickel in aqueous alkali or in an organic solvent. It may also be reduced by use of a noble metal catalyst such as platinum oxide, palladium back, and palladium on charcoal or other support. The reduction can be carried out by chemical means, as for example, by reduction with sodium amalgam in aqueous alkali. The resulting lactone can thereafter be dealkylated or dearalkylated, if desired. The dealkylation can be achieved by reaction with a dealkylating agent such as pyridine hydrochloride, potassium hydroxide, organo magnesium complexes, halogen acids in organic solvents, and related methods. The dearalkylation can be carried out similarly to the dealkylation or can be accomplished by hydrogenolysis, as, for example, with a palladium or platinum catalyst and hydrogen at 10–100 p. s. i. and at 20–100° C.

The following examples illustrate in detail methods of producing the compounds of this invention. It will be understood by those skilled in the art that numerous modifications in these procedures may be made without departing from the spirit or scope of the invention. The invention is not to be construed as limited to these examples.

Example 1

A solution of 158 parts of β-naphthyl methyl ether, 172 parts of chlorotrimethylacetyl chloride, and 840 parts of nitrobenzene is cooled to about 0° C. To this solution are added gradually and with efficient agitation 267 parts of anhydrous aluminum chloride in finely powdered form, the reaction mixture being kept at approximately ice temperature. The reaction mixture is allowed to stand at room temperature for about 24 hours. It is then quenched in an excess of ice and dilute hydrochloric acid. The organic layer is diluted with 3500 parts of ether and separated, washed with water, with 5% caustic soda solution, and again with water. The ether is evaporated and the residue is steam distilled to remove nitrobenzene. The residue from the steam distillation is extracted with ether and the ether extract is washed with water, dried, and evaporated. The residue thus obtained is taken up in 1750 parts of benzene and 2400 parts of petroleum ether. Upon chilling a crystalline precipitate of 3-chloro-2,2-dimethyl-1-(6-methoxy-2-naphthyl)-1-propanone is obtained. This compound melts at 85–85.6° C. upon recrystallization from benzene and petroleum ether. It has the formula

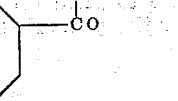

Example 2

Zinc-amalgam is prepared by treating 200 parts of 40-mesh zinc metal with 1000 parts of 3% hydrochloric acid solution containing 2 parts of mercuric chloride. The resulting product is washed with water, alcohol, and ether. One half of the amalgamated zinc is added to a solution of 30 parts of 3-chloro-2,2-dimethyl-1-(6-methoxy-2-naphthyl)-1-propanone in 660 parts of dry benzene. The mixture is refluxed and agitated and 18 parts of ethyl bromoacetate in 180 parts of ether are added. The mixture is agitated and refluxed for three hours, the remainder of the amalgamated zinc being added at 30-minute intervals. After one hour of refluxing another portion of 18 parts of ethyl bromoacetate and 180 parts of ether are added. The reaction mixture is treated with 200 parts of 10% acetic acid in methanol followed by 1400 parts of ether. The ethereal phase is separated and washed with 2000 parts 1 of N sulfuric acid, with water, with 3% aqueous ammonia until the washings are no longer colored, and then with water. The ether solution is dried and evaporated and the residue is taken up in 500 parts of acetic anhydride and heated at about 100° C. for 2 hours. The acetic anhydride is then evaporated under reduced pressure at 90° C. and 395 parts of methanol and 315 parts of 26% caustic potash solution are added and the resulting alkaline solution is refluxed for two hours. The reaction mixture is chilled, diluted with 2500 parts of water, and extracted with ether. The aqueous phase is separated, made strongly acid with sulfuric acid, and then extracted with ether. The ether extract is washed with water, with 3% sodium bicarbonate solution and with water. The bicarbonate extract is acidified and chilled. The crystalline precipitate of 5-hydroxy-4,4-dimethyl-3-(6-methoxy-2-naphthyl)-2-pentenoic acid is separated, washed with aqueous alcohol, and recrystallized from a mixture of benzene and acetone. The acid so obtained melts at 189–190° C. when pure. It has the formula

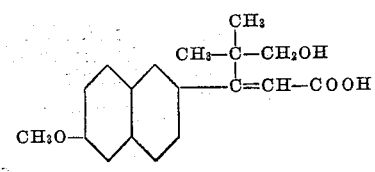

Example 3

11.5 parts of 5-hydroxy-4,4-dimethyl-3-(6-methoxy-2-naphthyl)-2-pentenoic acid are dissolved in 250 parts of water containing 13.7 parts of 26% caustic potash solution. To this solution are added 600 parts of 2% sodium amalgam. The resulting mixture is agitated with intermittent heating at about 80–100° C. for 30 minutes. The solution is separated by decantation, washed with ether, and then made strongly acid with sulfuric acid. The acid solution is extracted with ether and the ether solution is washed with water, with 3% sodium bicarbonate solution, and then with water. It is then treated with a trace of acetic acid and the ether is removed by evaporation. The residue is crystallized from aqueous methanol and the lactone of 5-hydroxy-4,4-dimethyl-3-(6-methoxy-2-naphthyl)pentanoic acid melts at 150.5–151.5° C. It has the formula

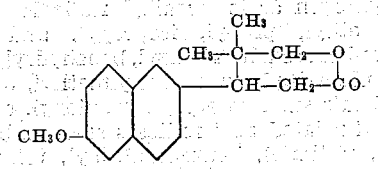

Example 4

3 parts of the foregoing lactone are fused for 2 hours at 190° C. with 15 parts of pyridine hydrochloride. The melt is then cooled and taken up in 1400 parts of ether and 1500 parts of 3% hydrochloric acid. The ether solution is separated, washed with water, dried, and evaporated. The residue is crystallized from aqueous methanol and from a mixture of acetone and cyclohexane. The lactone of 5-hydroxy-4,4-dimethyl-3-(6-hydroxy-2-naphthyl)-pentanoic acid melts at 192–193° C.

Example 5

4 parts of 3-chloro-2,2-dimethyl-1-(6-methoxy-2-naphthyl)-1-propanone in 103 parts of methanol containing 37.5 parts of 26% caustic potash solution are refluxed for 2 hours. The solution is then evaporated in vacuo at room temperature until turbid and allowed to stand at low temperature. Crystals of 3-hydroxy-2,2-dimethyl-1-(6-methoxy-2-naphthyl)-1-propanone precipitate. These are collected on a filter, washed with water, and recrystallized from aqueous acetone. They form white plates melting at about 119° C.

Example 6

15 parts of 3-chloro-2,2-dimethyl-1-(6-methoxy-2-naphthyl)-1-propanone are reacted with a total of 20 parts of ethyl α-bromopropionate in the presence of 20 parts of amalgamated zinc in dry benzene and ether, according to the method of Example 2. The hydroxy ester is isolated as follows: The reaction mixture is diluted with 10% acetic acid in methanol and then extracted with ether. The ether extract is washed with dilute sulfuric acid, with water, with dilute ammonia water and finally with water. The dried ether extract is evaporated, yielding the hydroxy ester. This is treated with 25 parts of acetic anhydride at 90–95° C. for 2 hours, and then evaporated under vacuum. The residue of the resulting unsaturated ester is refluxed for 2 hours in 40% potassium hydroxide solution in 70% methanol. The methanol is removed by distillation and the chilled alkaline solution is diluted with water and extracted with ether. The alkaline solution is then acidified and extracted with ether. The ether extract is washed with water and then extracted with 3% sodium bicarbonate solution. The bicarbonate extract is chilled and acidified. On standing, colorless crystals of 5-hydroxy-2,4,4-trimethyl-3-(6-methoxy-2-naphthyl)-2-pentenoic acid separate. These are separated, washed with water and dried. The acid has the formula

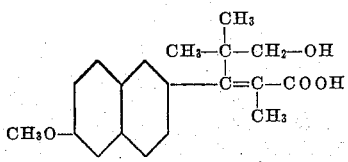

*Example 7*

10 parts of 5-hydroxy-2,4,4-trimethyl-3-(6-methoxy-2-naphthyl)-2-pentenoic acid are dissolved in 150 parts of glacial acetic acid and hydrogenated in the presence of 0.2 parts of platinum oxide at 50° C. and at 35–50 lb. hydrogen pressure. After the hydrogen uptake ceases the solution is filtered and evaporated under vacuum. The residue is taken up in dilute alkali, filtered, acidified and then extracted with ether. The ether extract is washed with water, dried, treated with a small amount of glacial acetic acid and evaporated to dryness. The crystalline residue of the lactone of 5-hydroxy-2,4,4-trimethyl-3-(6-methoxy-2-naphthyl)pentanoic acid is separated and dried. This substance has the formula

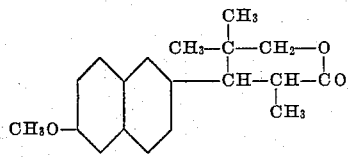

*Example 8*

3 parts of the lactone of 5-hydroxy-2,4,4-trimethyl-3-(6-methoxy-2-naphthyl)pentanoic acid are demethylated by fusion with 15 parts of pyridine hydrochloride as in Example 4. The mixture is then partitioned between 150 parts of 3% muriatic acid and 150 parts of ether. The ether solution is washed with water, dried and evaporated to dryness. The crystalline residue of the lactone of 5-hydroxy-2,4,4-trimethyl-3-(6-hydroxy-2-naphthyl)pentanoic acid is separated and dried. This compound has the formula

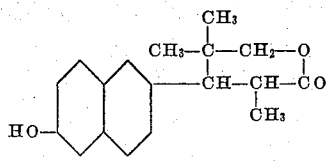

I claim:
1. A compound of the formula

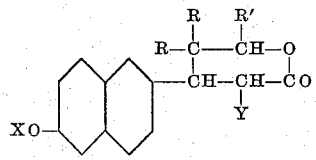

wherein X is a member of the group consisting of hydrogen, lower alkyl and lower acyl radicals, R and R' are members of the group consisting of hydrogen and lower alkyl radicals and Y is a member of the group consisting of hydrogen and lower alkyl radicals.

2. A compound of the formula

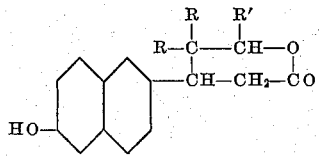

wherein R and R' are lower alkyl radicals.

3. A compound of the formula

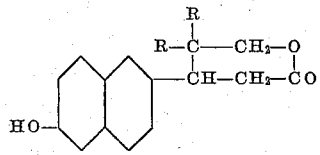

wherein R is a lower alkyl radical.

4. A compound as in claim 3 wherein R is a methyl radical.

5. A compound of the formula

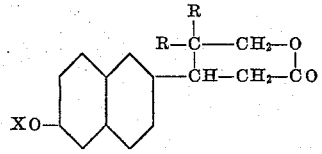

wherein X is a lower alkyl radical and R is a lower alkyl radical.

6. A compound as in claim 5 wherein X is a lower alkyl radical and R is a methyl radical.

7. A compound as in claim 5 wherein X and R are methyl radicals.

MAX N. HUFFMAN.

No references cited.